US008922937B1

(12) United States Patent
Chahwan et al.

(10) Patent No.: US 8,922,937 B1
(45) Date of Patent: Dec. 30, 2014

(54) DISK DRIVE EVALUATING MULTIPLE VIBRATION SENSOR OUTPUTS TO ENABLE WRITE-PROTECTION

(75) Inventors: Alain Chahwan, Irvine, CA (US); Orhan Beker, Aliso Viejo, CA (US); Chuanwen Ji, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 56 days.

(21) Appl. No.: 13/451,373

(22) Filed: Apr. 19, 2012

(51) Int. Cl.
*G11B 21/02* (2006.01)

(52) U.S. Cl.
USPC ............................................. 360/75; 360/55

(58) Field of Classification Search
USPC ................................ 360/55, 75, 77.02, 78.04
See application file for complete search history.

(56) References Cited

U.S. PATENT DOCUMENTS

| | | | |
|---|---|---|---|
| 5,936,787 A * | 8/1999 | Ohmi | ........................ 360/73.03 |
| 6,014,283 A | 1/2000 | Codilian et al. | |
| 6,052,076 A | 4/2000 | Patton, III et al. | |
| 6,052,250 A | 4/2000 | Golowka et al. | |
| 6,067,206 A | 5/2000 | Hull et al. | |
| 6,078,453 A | 6/2000 | Dziallo et al. | |
| 6,091,564 A | 7/2000 | Codilian et al. | |
| 6,094,020 A | 7/2000 | Goretzki et al. | |
| 6,101,065 A | 8/2000 | Alfred et al. | |
| 6,104,153 A | 8/2000 | Codilian et al. | |
| 6,122,133 A | 9/2000 | Nazarian et al. | |
| 6,122,135 A | 9/2000 | Stich | |
| 6,141,175 A | 10/2000 | Nazarian et al. | |
| 6,160,368 A | 12/2000 | Plutowski | |
| 6,181,502 B1 | 1/2001 | Hussein et al. | |
| 6,195,222 B1 | 2/2001 | Heminger et al. | |
| 6,198,584 B1 | 3/2001 | Codilian et al. | |
| 6,198,590 B1 | 3/2001 | Codilian et al. | |
| 6,204,988 B1 | 3/2001 | Codilian et al. | |
| 6,215,608 B1 | 4/2001 | Serrano et al. | |
| 6,243,223 B1 | 6/2001 | Elliott et al. | |
| 6,281,652 B1 | 8/2001 | Ryan et al. | |
| 6,285,521 B1 | 9/2001 | Hussein | |
| 6,292,320 B1 | 9/2001 | Mason et al. | |
| 6,310,742 B1 | 10/2001 | Nazarian et al. | |
| 6,320,718 B1 | 11/2001 | Bouwkamp et al. | |
| 6,342,984 B1 | 1/2002 | Hussein et al. | |
| 6,347,018 B1 | 2/2002 | Kadlec et al. | |
| 6,369,972 B1 | 4/2002 | Codilian et al. | |
| 6,369,974 B1 | 4/2002 | Asgari et al. | |
| 6,462,896 B1 | 10/2002 | Codilian et al. | |
| 6,476,996 B1 | 11/2002 | Ryan | |
| 6,484,577 B1 | 11/2002 | Bennett | |
| 6,493,169 B1 | 12/2002 | Ferris et al. | |
| 6,496,324 B1 | 12/2002 | Golowka et al. | |

(Continued)

OTHER PUBLICATIONS

Daniel J. Gunderson, et. al., U.S. Appl. No. 13/246,600, filed Sep. 27, 2011, 17 pages.

*Primary Examiner* — Tan X Dinh

(57) ABSTRACT

A disk drive is disclosed comprising a head actuated over a disk, and control circuitry including a vibration sensor. A position error signal (PES) is generated representing a radial location of the head over the disk, and the head is servoed radially over the disk in response to the PES. A first vibration signal is generated in response to the vibration sensor, and a second vibration signal in response to the PES. The first vibration signal is combined with the second vibration signal to generate a third vibration signal, and a vibration event is detected in response to the third vibration signal.

22 Claims, 4 Drawing Sheets

(56) References Cited

U.S. PATENT DOCUMENTS

| | | | |
|---|---|---|---|
| 6,498,698 B1 | 12/2002 | Golowka et al. | |
| 6,507,450 B1 | 1/2003 | Elliott | |
| 6,534,936 B2 | 3/2003 | Messenger et al. | |
| 6,538,839 B1 * | 3/2003 | Ryan | 360/77.02 |
| 6,545,835 B1 | 4/2003 | Codilian et al. | |
| 6,549,359 B1 | 4/2003 | Bennett et al. | |
| 6,549,361 B1 | 4/2003 | Bennett et al. | |
| 6,560,056 B1 | 5/2003 | Ryan | |
| 6,568,268 B1 | 5/2003 | Bennett | |
| 6,574,062 B1 | 6/2003 | Bennett et al. | |
| 6,577,465 B1 | 6/2003 | Bennett et al. | |
| 6,614,615 B1 | 9/2003 | Ju et al. | |
| 6,614,618 B1 | 9/2003 | Sheh et al. | |
| 6,636,377 B1 | 10/2003 | Yu et al. | |
| 6,690,536 B1 | 2/2004 | Ryan | |
| 6,693,764 B1 | 2/2004 | Sheh et al. | |
| 6,707,635 B1 | 3/2004 | Codilian et al. | |
| 6,710,953 B1 | 3/2004 | Vallis et al. | |
| 6,710,966 B1 | 3/2004 | Codilian et al. | |
| 6,714,371 B1 | 3/2004 | Codilian | |
| 6,714,372 B1 | 3/2004 | Codilian et al. | |
| 6,717,757 B1 | 4/2004 | Levy et al. | |
| 6,724,564 B1 | 4/2004 | Codilian et al. | |
| 6,731,450 B1 | 5/2004 | Codilian et al. | |
| 6,735,041 B1 | 5/2004 | Codilian et al. | |
| 6,738,220 B1 | 5/2004 | Codilian | |
| 6,747,837 B1 | 6/2004 | Bennett | |
| 6,760,186 B1 | 7/2004 | Codilian et al. | |
| 6,788,483 B1 | 9/2004 | Ferris et al. | |
| 6,791,785 B1 | 9/2004 | Messenger et al. | |
| 6,795,262 B1 | 9/2004 | Codilian et al. | |
| 6,795,268 B1 | 9/2004 | Ryan | |
| 6,819,518 B1 | 11/2004 | Melkote et al. | |
| 6,826,006 B1 | 11/2004 | Melkote et al. | |
| 6,826,007 B1 | 11/2004 | Patton, III | |
| 6,847,502 B1 | 1/2005 | Codilian | |
| 6,850,383 B1 | 2/2005 | Bennett | |
| 6,850,384 B1 | 2/2005 | Bennett | |
| 6,867,944 B1 | 3/2005 | Ryan | |
| 6,876,508 B1 | 4/2005 | Patton, III et al. | |
| 6,882,496 B1 | 4/2005 | Codilian et al. | |
| 6,885,514 B1 | 4/2005 | Codilian et al. | |
| 6,900,958 B1 | 5/2005 | Yi et al. | |
| 6,900,959 B1 | 5/2005 | Gardner et al. | |
| 6,903,897 B1 | 6/2005 | Wang et al. | |
| 6,914,740 B1 | 7/2005 | Tu et al. | |
| 6,914,743 B1 | 7/2005 | Narayana et al. | |
| 6,920,004 B1 | 7/2005 | Codilian et al. | |
| 6,924,959 B1 | 8/2005 | Melkote et al. | |
| 6,924,960 B1 | 8/2005 | Melkote et al. | |
| 6,924,961 B1 | 8/2005 | Melkote et al. | |
| 6,934,114 B1 | 8/2005 | Codilian et al. | |
| 6,934,135 B1 | 8/2005 | Ryan | |
| 6,937,420 B1 | 8/2005 | McNab et al. | |
| 6,937,423 B1 | 8/2005 | Ngo et al. | |
| 6,952,322 B1 | 10/2005 | Codilian et al. | |
| 6,954,324 B1 | 10/2005 | Tu et al. | |
| 6,958,881 B1 | 10/2005 | Codilian et al. | |
| 6,963,465 B1 | 11/2005 | Melkote et al. | |
| 6,965,488 B1 | 11/2005 | Bennett | |
| 6,967,458 B1 | 11/2005 | Bennett et al. | |
| 6,967,811 B1 | 11/2005 | Codilian et al. | |
| 6,970,319 B1 | 11/2005 | Bennett et al. | |
| 6,972,539 B1 | 12/2005 | Codilian et al. | |
| 6,972,540 B1 | 12/2005 | Wang et al. | |
| 6,972,922 B1 | 12/2005 | Subrahmanyam et al. | |
| 6,975,480 B1 | 12/2005 | Codilian et al. | |
| 6,977,789 B1 | 12/2005 | Cloke | |
| 6,980,389 B1 | 12/2005 | Kupferman | |
| 6,987,636 B1 | 1/2006 | Chue et al. | |
| 6,987,639 B1 | 1/2006 | Yu | |
| 6,989,954 B1 | 1/2006 | Lee et al. | |
| 6,992,848 B1 | 1/2006 | Agarwal et al. | |
| 6,992,851 B1 | 1/2006 | Cloke | |
| 6,992,852 B1 | 1/2006 | Ying et al. | |
| 6,995,941 B1 | 2/2006 | Miyamura et al. | |
| 6,999,263 B1 | 2/2006 | Melkote et al. | |
| 6,999,267 B1 | 2/2006 | Melkote et al. | |
| 7,006,320 B1 | 2/2006 | Bennett et al. | |
| 7,016,134 B1 | 3/2006 | Agarwal et al. | |
| 7,023,637 B1 | 4/2006 | Kupferman | |
| 7,023,640 B1 | 4/2006 | Codilian et al. | |
| 7,027,256 B1 | 4/2006 | Subrahmanyam et al. | |
| 7,027,257 B1 | 4/2006 | Kupferman | |
| 7,035,026 B2 | 4/2006 | Codilian et al. | |
| 7,046,472 B1 | 5/2006 | Melkote et al. | |
| 7,050,249 B1 | 5/2006 | Chue et al. | |
| 7,050,254 B1 | 5/2006 | Yu et al. | |
| 7,050,258 B1 | 5/2006 | Codilian | |
| 7,054,098 B1 | 5/2006 | Yu et al. | |
| 7,061,714 B1 | 6/2006 | Yu | |
| 7,064,918 B1 | 6/2006 | Codilian et al. | |
| 7,068,451 B1 | 6/2006 | Wang et al. | |
| 7,068,459 B1 | 6/2006 | Cloke et al. | |
| 7,068,461 B1 | 6/2006 | Chue et al. | |
| 7,068,463 B1 | 6/2006 | Ji et al. | |
| 7,088,547 B1 | 8/2006 | Wang et al. | |
| 7,095,579 B1 | 8/2006 | Ryan et al. | |
| 7,110,208 B1 | 9/2006 | Miyamura et al. | |
| 7,110,214 B1 | 9/2006 | Tu et al. | |
| 7,113,362 B1 | 9/2006 | Lee et al. | |
| 7,113,365 B1 | 9/2006 | Ryan et al. | |
| 7,116,505 B1 | 10/2006 | Kupferman | |
| 7,126,781 B1 | 10/2006 | Bennett | |
| 7,158,329 B1 | 1/2007 | Ryan | |
| 7,177,106 B2 | 2/2007 | Inaji et al. | |
| 7,180,703 B1 | 2/2007 | Subrahmanyam et al. | |
| 7,184,230 B1 | 2/2007 | Chue et al. | |
| 7,196,864 B1 | 3/2007 | Yi et al. | |
| 7,199,966 B1 | 4/2007 | Tu et al. | |
| 7,203,021 B1 | 4/2007 | Ryan et al. | |
| 7,209,321 B1 | 4/2007 | Bennett | |
| 7,212,364 B1 | 5/2007 | Lee | |
| 7,212,374 B1 | 5/2007 | Wang et al | |
| 7,215,504 B1 | 5/2007 | Bennett | |
| 7,221,532 B1 * | 5/2007 | Shukla | 360/75 |
| 7,224,546 B1 | 5/2007 | Orakcilar et al. | |
| 7,248,426 B1 | 7/2007 | Weerasooriya et al. | |
| 7,251,098 B1 | 7/2007 | Wang et al. | |
| 7,253,582 B1 | 8/2007 | Ding et al. | |
| 7,253,989 B1 | 8/2007 | Lau et al. | |
| 7,265,933 B1 | 9/2007 | Phan et al. | |
| 7,289,288 B1 | 10/2007 | Tu | |
| 7,298,574 B1 | 11/2007 | Melkote et al. | |
| 7,301,717 B1 | 11/2007 | Lee et al. | |
| 7,304,819 B1 | 12/2007 | Melkote et al. | |
| 7,330,019 B1 | 2/2008 | Bennett et al. | |
| 7,330,327 B1 | 2/2008 | Chue et al. | |
| 7,333,280 B1 | 2/2008 | Lifchits et al. | |
| 7,333,290 B1 | 2/2008 | Kupferman | |
| 7,339,761 B1 | 3/2008 | Tu et al. | |
| 7,365,932 B1 | 4/2008 | Bennett | |
| 7,388,728 B1 | 6/2008 | Chen et al. | |
| 7,391,583 B1 | 6/2008 | Sheh et al. | |
| 7,391,584 B1 | 6/2008 | Sheh et al. | |
| 7,433,143 B1 | 10/2008 | Ying et al. | |
| 7,440,210 B1 | 10/2008 | Lee | |
| 7,440,225 B1 | 10/2008 | Chen et al. | |
| 7,450,334 B1 | 11/2008 | Wang et al. | |
| 7,450,336 B1 | 11/2008 | Wang et al. | |
| 7,453,661 B1 | 11/2008 | Jang et al. | |
| 7,457,071 B1 | 11/2008 | Sheh | |
| 7,466,509 B1 | 12/2008 | Chen et al. | |
| 7,468,855 B1 | 12/2008 | Weerasooriya et al. | |
| 7,474,491 B2 | 1/2009 | Liikanen et al. | |
| 7,477,471 B1 | 1/2009 | Nemshick et al. | |
| 7,480,116 B1 | 1/2009 | Bennett | |
| 7,489,464 B1 | 2/2009 | McNab et al. | |
| 7,492,546 B1 | 2/2009 | Miyamura | |
| 7,495,857 B1 | 2/2009 | Bennett | |
| 7,499,236 B1 | 3/2009 | Lee et al. | |
| 7,502,192 B1 | 3/2009 | Wang et al. | |
| 7,502,195 B1 | 3/2009 | Wu et al. | |
| 7,502,197 B1 | 3/2009 | Chue | |

(56) References Cited

U.S. PATENT DOCUMENTS

| | | | |
|---|---|---|---|
| 7,505,223 | B1 | 3/2009 | McCornack |
| 7,542,225 | B1 | 6/2009 | Ding et al. |
| 7,545,593 | B1 | 6/2009 | Sun et al. |
| 7,548,392 | B1 | 6/2009 | Desai et al. |
| 7,551,390 | B1 | 6/2009 | Wang et al. |
| 7,558,016 | B1 | 7/2009 | Le et al. |
| 7,573,670 | B1 | 8/2009 | Ryan et al. |
| 7,576,941 | B1 | 8/2009 | Chen et al. |
| 7,580,212 | B1 | 8/2009 | Li et al. |
| 7,583,470 | B1 | 9/2009 | Chen et al. |
| 7,595,954 | B1 | 9/2009 | Chen et al. |
| 7,602,575 | B1 | 10/2009 | Lifchits et al. |
| 7,616,399 | B1 | 11/2009 | Chen et al. |
| 7,619,844 | B1 | 11/2009 | Bennett |
| 7,626,782 | B1 | 12/2009 | Yu et al. |
| 7,630,162 | B2 | 12/2009 | Zhao et al. |
| 7,639,447 | B1 | 12/2009 | Yu et al. |
| 7,656,604 | B1 | 2/2010 | Liang et al. |
| 7,656,607 | B1 | 2/2010 | Bennett |
| 7,660,067 | B1 | 2/2010 | Ji et al. |
| 7,663,835 | B1 | 2/2010 | Yu et al. |
| 7,675,707 | B1 | 3/2010 | Liu et al. |
| 7,679,854 | B1 | 3/2010 | Narayana et al. |
| 7,688,534 | B1 | 3/2010 | McCornack |
| 7,688,538 | B1 | 3/2010 | Chen et al. |
| 7,688,539 | B1 | 3/2010 | Bryant et al. |
| 7,697,233 | B1 | 4/2010 | Bennett et al. |
| 7,701,661 | B1 | 4/2010 | Bennett |
| 7,710,676 | B1 | 5/2010 | Chue |
| 7,715,138 | B1 | 5/2010 | Kupferman |
| 7,729,079 | B1 | 6/2010 | Huber |
| 7,733,189 | B1 | 6/2010 | Bennett |
| 7,746,592 | B1 | 6/2010 | Liang et al. |
| 7,746,594 | B1 | 6/2010 | Guo et al. |
| 7,746,595 | B1 | 6/2010 | Guo et al. |
| 7,760,461 | B1 | 7/2010 | Bennett |
| 7,800,853 | B1 | 9/2010 | Guo et al. |
| 7,800,856 | B1 | 9/2010 | Bennett et al. |
| 7,800,857 | B1 | 9/2010 | Calaway et al. |
| 7,839,591 | B1 | 11/2010 | Weerasooriya et al. |
| 7,839,595 | B1 | 11/2010 | Chue et al. |
| 7,839,600 | B1 | 11/2010 | Babinski et al. |
| 7,843,662 | B1 | 11/2010 | Weerasooriya et al. |
| 7,852,588 | B1 | 12/2010 | Ferris et al. |
| 7,852,592 | B1 | 12/2010 | Liang et al. |
| 7,864,481 | B1 | 1/2011 | Kon et al. |
| 7,864,482 | B1 | 1/2011 | Babinski et al. |
| 7,869,155 | B1 | 1/2011 | Wong |
| 7,876,522 | B1 | 1/2011 | Calaway et al. |
| 7,876,523 | B1 | 1/2011 | Panyavoravaj et al. |
| 7,903,364 | B2 | 3/2011 | Jeong |
| 7,916,415 | B1 | 3/2011 | Chue |
| 7,916,416 | B1 | 3/2011 | Guo et al. |
| 7,916,420 | B1 | 3/2011 | McFadyen et al. |
| 7,916,422 | B1 | 3/2011 | Guo et al. |
| 7,929,238 | B1 | 4/2011 | Vasquez |
| 7,961,422 | B1 | 6/2011 | Chen et al. |
| 8,000,053 | B1 | 8/2011 | Anderson |
| 8,031,423 | B1 | 10/2011 | Tsai et al. |
| 8,054,022 | B1 | 11/2011 | Ryan et al. |
| 8,059,357 | B1 | 11/2011 | Knigge et al. |
| 8,059,360 | B1 | 11/2011 | Melkote et al. |
| 8,072,703 | B1 | 12/2011 | Calaway et al. |
| 8,077,428 | B1 | 12/2011 | Chen et al. |
| 8,078,901 | B1 | 12/2011 | Meyer et al. |
| 8,081,395 | B1 | 12/2011 | Ferris |
| 8,085,020 | B1 | 12/2011 | Bennett |
| 8,116,023 | B1 | 2/2012 | Kupferman |
| 8,145,934 | B1 | 3/2012 | Ferris et al. |
| 8,179,626 | B1 | 5/2012 | Ryan et al. |
| 8,189,286 | B1 | 5/2012 | Chen et al. |
| 8,213,106 | B1 | 7/2012 | Guo et al. |
| 8,254,222 | B1 | 8/2012 | Tang |
| 8,300,348 | B1 | 10/2012 | Liu et al. |
| 8,315,005 | B1 | 11/2012 | Zou et al. |
| 8,320,069 | B1 | 11/2012 | Knigge et al. |
| 8,351,174 | B1 | 1/2013 | Gardner et al. |
| 8,358,114 | B1 | 1/2013 | Ferris et al. |
| 8,358,145 | B1 | 1/2013 | Ferris et al. |
| 8,390,367 | B1 | 3/2013 | Bennett |
| 8,432,031 | B1 | 4/2013 | Agness et al. |
| 8,432,629 | B1 | 4/2013 | Rigney et al. |
| 8,451,697 | B1 | 5/2013 | Rigney et al. |
| 8,482,873 | B1 | 7/2013 | Chue et al. |
| 8,498,076 | B1 | 7/2013 | Sheh et al. |
| 8,498,172 | B1 | 7/2013 | Patton, III et al. |
| 8,508,881 | B1 | 8/2013 | Babinski et al. |
| 8,531,798 | B1 | 9/2013 | Xi et al. |
| 8,537,486 | B2 | 9/2013 | Liang et al. |
| 8,542,455 | B2 | 9/2013 | Huang et al. |
| 8,553,351 | B1 | 10/2013 | Narayana et al. |
| 8,564,899 | B2 | 10/2013 | Lou et al. |
| 8,576,506 | B1 | 11/2013 | Wang et al. |
| 8,605,382 | B1 | 12/2013 | Mallary et al. |
| 8,605,384 | B1 | 12/2013 | Liu et al. |
| 8,610,391 | B1 | 12/2013 | Yang et al. |
| 8,611,040 | B1 | 12/2013 | Xi et al. |
| 8,619,385 | B1 | 12/2013 | Guo et al. |
| 8,630,054 | B2 | 1/2014 | Bennett et al. |
| 8,630,059 | B1 | 1/2014 | Chen et al. |
| 8,634,154 | B1 | 1/2014 | Rigney et al. |
| 8,634,283 | B1 | 1/2014 | Rigney et al. |
| 8,643,976 | B1 | 2/2014 | Wang et al. |
| 8,649,121 | B1 | 2/2014 | Smith et al. |
| 8,654,466 | B1 | 2/2014 | McFadyen |
| 8,654,467 | B1 | 2/2014 | Wong et al. |
| 8,665,546 | B1 | 3/2014 | Zhao et al. |
| 8,665,551 | B1 | 3/2014 | Rigney et al. |
| 8,670,206 | B1 | 3/2014 | Liang et al. |
| 8,687,312 | B1 | 4/2014 | Liang |
| 8,693,123 | B1 | 4/2014 | Guo et al. |
| 8,693,134 | B1 | 4/2014 | Xi et al. |
| 8,699,173 | B1 | 4/2014 | Kang et al. |
| 8,711,027 | B1 | 4/2014 | Bennett |
| 8,717,696 | B1 | 5/2014 | Ryan et al. |
| 8,717,699 | B1 | 5/2014 | Ferris |
| 8,717,704 | B1 | 5/2014 | Yu et al. |
| 8,724,245 | B1 | 5/2014 | Smith et al. |
| 8,724,253 | B1 | 5/2014 | Liang et al. |
| 8,724,524 | B2 | 5/2014 | Urabe et al. |
| 8,737,008 | B1 | 5/2014 | Watanabe et al. |
| 8,737,013 | B2 | 5/2014 | Zhou et al. |
| 8,743,495 | B1 | 6/2014 | Chen et al. |
| 8,743,503 | B1 | 6/2014 | Tang et al. |
| 8,743,504 | B1 | 6/2014 | Bryant et al. |
| 8,749,904 | B1 | 6/2014 | Liang et al. |
| 8,760,796 | B1 | 6/2014 | Lou et al. |
| 8,767,332 | B1 | 7/2014 | Chahwan et al. |
| 8,767,343 | B1 | 7/2014 | Helmick et al. |
| 8,767,354 | B1 | 7/2014 | Ferris et al. |
| 8,773,787 | B1 | 7/2014 | Beker |
| 8,779,574 | B1 | 7/2014 | Agness et al. |
| 8,780,473 | B1 | 7/2014 | Zhao et al. |
| 8,780,477 | B1 | 7/2014 | Guo et al. |
| 8,780,479 | B1 | 7/2014 | Helmick et al. |
| 8,780,489 | B1 | 7/2014 | Gayaka et al. |
| 8,792,202 | B1 | 7/2014 | Wan et al. |
| 8,797,664 | B1 | 8/2014 | Guo et al. |
| 8,804,267 | B2 | 8/2014 | Huang et al. |
| 2009/0268340 | A1* | 10/2009 | Supino et al. .............. 360/77.14 |
| 2010/0035085 | A1 | 2/2010 | Jung et al. |
| 2010/0067357 | A1* | 3/2010 | Huang et al. ............... 369/247.1 |
| 2011/0085260 | A1* | 4/2011 | Wada et al. ..................... 360/75 |
| 2012/0284493 | A1 | 11/2012 | Lou et al. |
| 2013/0120870 | A1 | 5/2013 | Zhou et al. |
| 2013/0148240 | A1 | 6/2013 | Ferris et al. |

\* cited by examiner ated over a disk 18, and control circuitry 20 including a vibration sensor 22. The control circuitry 20 is operable to execute the flow diagram of FIG. 2C, wherein a position error signal (PES) is generated representing a radial location of the head over the disk (block 24), and the head is servoed radially over the disk in response to the PES (block 26). A first vibration signal is generated in response to the vibration sensor (block 28), and a second vibration signal is generated in response to the PES (block 30). The first vibration signal is combined with the second vibration signal to generate a third vibration signal (block 32), and a vibration event is detected in response to the third vibration signal (block 34).

DISK DRIVE EVALUATING MULTIPLE VIBRATION SENSOR OUTPUTS TO ENABLE WRITE-PROTECTION

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a VCM servo controller to control the velocity of the actuator arm as it seeks from track to track.

FIG. 1 shows a prior art disk format 2 comprising a number of servo tracks 4 defined by concentric servo sectors $6_0$-$6_N$ recorded around the circumference of each servo track, wherein data tracks are defined relative to the servo tracks 4. Each servo sector $6_i$ comprises a preamble 8 for storing a periodic pattern, which allows proper gain adjustment and timing synchronization of the read signal, and a sync mark 10 for storing a special pattern used to synchronize to a servo data field 12. The servo data field 12 stores coarse head positioning information, such as a servo track address, used to position the head over a target data track during a seek operation. Each servo sector 6, further comprises groups of servo bursts 14 (e.g., A, B, C and D bursts), which comprise a number of consecutive transitions recorded at precise intervals and offsets with respect to a data track centerline. The groups of servo bursts 14 provide fine head position information used for centerline tracking while accessing a data track during write/read operations.

DETAILED DESCRIPTION

Figure 2A:
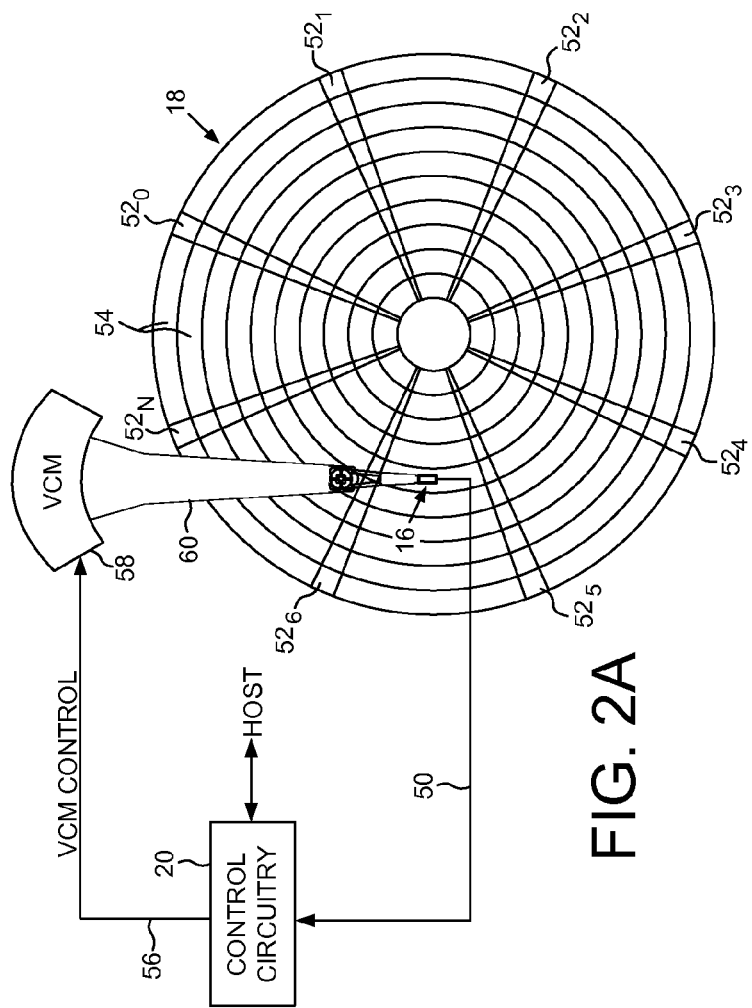
FIG. 2A shows a disk drive according to an embodiment of the present invention comprising control circuitry operable to actuate a head over a disk.
Figure 2B:
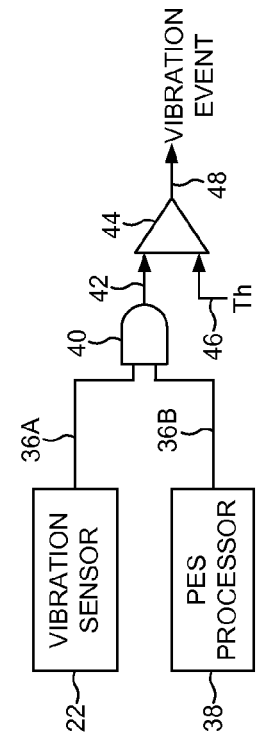
FIG. 2B shows control circuitry according to an embodiment of the present invention comprising a vibration sensor operable to generate a first vibration signal and a position error signal (PES) processor operable to generate a second vibration signal.

FIGS. 2A and 2B show a disk drive according to an embodiment of the present invention comprising a head 16

In the embodiment of FIG. 2B, the vibration sensor 22 generates the first vibration signal 36A and a PES processor 38 generates the second vibration signal 36B. A processing element 40 combines the first and second vibration signals 36A and 36B to generate the third vibration signal 42. The processing element 40 may comprise a digital AND gate, or an adder, or any other suitable combining function. In the embodiment of FIG. 2B, the third vibration signal 42 is compared 44 to a threshold 46 in order to detect the vibration event 48. In an alternative embodiment, the output 42 of the processing element 40 (e.g., AND gate) may represent the detected vibration event.

In one embodiment, each vibration signal essentially operates to validate the other vibration signal. For example, if the first vibration signal 36A is 50% sure that a vibration of significance is occurring (e.g., 50% of full magnitude), the vibration event 48 may not be detected unless the second vibration signal 36B also detects the vibration with a predetermined degree of certainty (e.g., 50% of full magnitude). In another embodiment, either vibration signal 36A or 36B may trigger the vibration event 48 regardless of the other vibration signal after reaching a predetermined degree of certainty (e.g., 85% of magnitude). As described in greater detail below, evaluating multiple vibration signals in order to validate a vibration event helps avoid falsely detecting vibration events which will unnecessarily reduce the performance of the disk drive, and may also prevent reducing the storage capacity by disabling defect mapping (data relocation) while a true vibration event is occurring.

Figure 1:
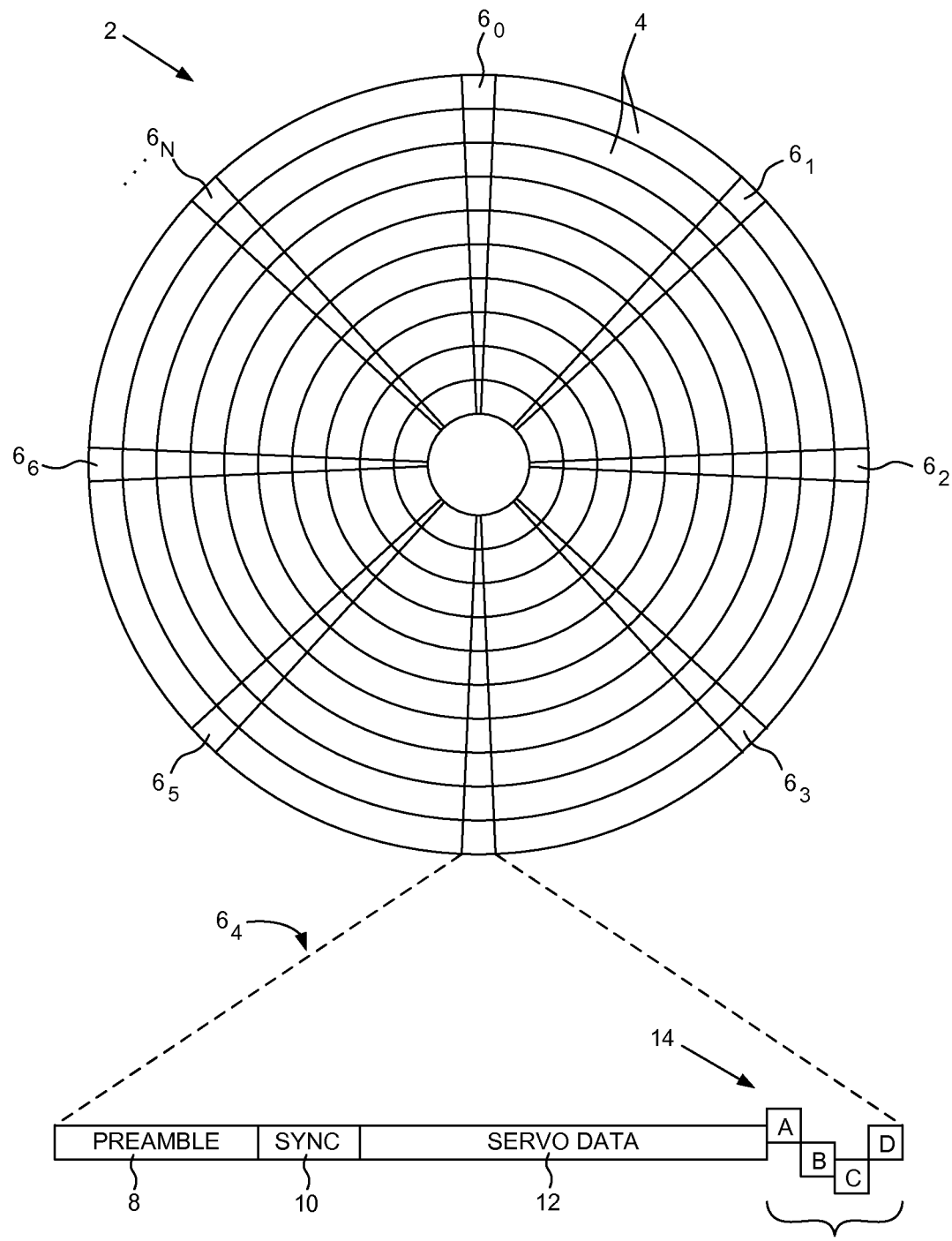
FIG. 1 shows a prior art disk format comprising a plurality of servo tracks defined by embedded servo sectors.

In the embodiment of FIG. 2A, the control circuitry 20 processes a read signal 50 emanating from the head 16 to demodulate servo sectors $52_0$-$52_N$ on the disk 18 and generate the PES representing an error between the actual position of the head and a target position relative to a target track 54. The control circuitry 20 filters the PES using suitable compensation filters to generate a control signal 56 applied to a voice coil motor (VCM) 58 which rotates an actuator arm 60 about a pivot, thereby actuating the head 16 radially over the disk 18 in a direction that reduces the PES. The actual position of the head is measured by reading position information derived from the servo sectors $52_0$-$52_N$, such as a track address for coarse positioning and servo bursts for fine positioning. The servo bursts may comprise any suitable pattern, such as an amplitude based servo pattern as shown in FIG. 1, or a suitable phase based servo pattern.

When the disk drive is subject to a vibration, the vibration will manifest in the PES due to the perturbation of the actuator arm 60. However, the PES may not always accurately reflect the magnitude of a vibration. For example, the PES may reflect factors other than a vibration, such as defects on the disk which can reduce the reliability and/or accuracy of the position information recorded in each servo sector. As described in more detail below, a portion of a data track (or an entire data track) may be relocated if the corresponding PES generated while servoing on the data track indicates poor tracking performance. However, if the vibration sensor 22 indicates the poor tracking performance is due to a vibration (rather than defective servo sectors), in one embodiment the relocation operation may be suspended until both the PES and the vibration sensor indicate that the vibration has subsided.

Figure 3A:
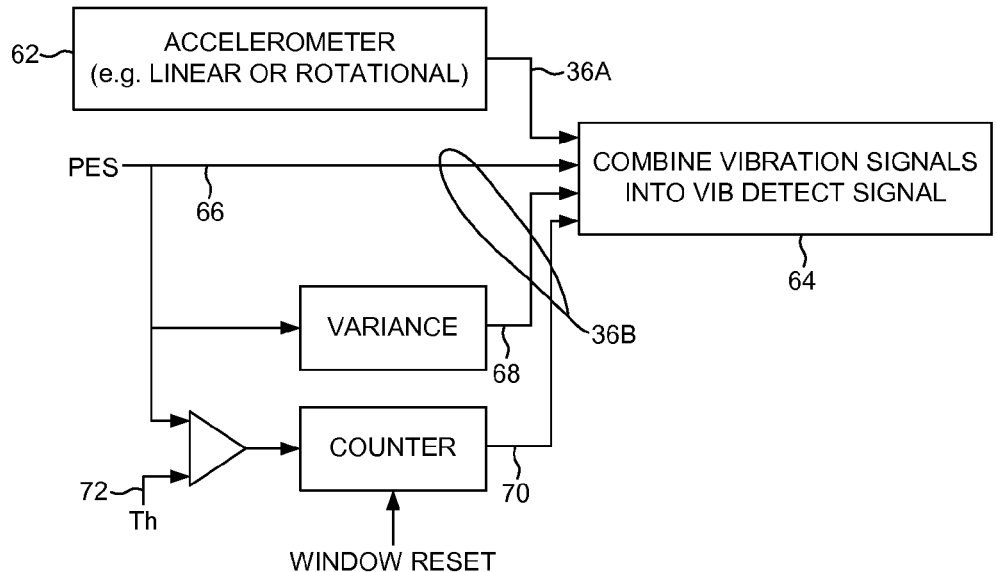
FIG. 3A shows control circuitry according to an embodiment of the present invention wherein the vibration sensor comprises an accelerometer and the PES processor evaluates a variance of the PES as well as a magnitude of the PES over a predetermined interval.

FIG. 3A shows an embodiment of the present invention wherein the vibration sensor 22 of FIG. 2B comprises a suitable accelerometer 62, such as a suitable linear or rotational accelerometer. However, any suitable vibration sensor may be employed in the embodiments of the present invention, such as a suitable piezoelectric (PZT) sensor. In one embodiment, a dedicated PZT sensor may be mounted at a suitable location in the disk drive, such as on the actuator arm 60. In another embodiment, a PZT microactuator may be used to actuate the head 16 in fine movements over the disk 18, while the VCM 58 actuates the head 16 in coarse movements. In one embodiment, the PZT microactuator may also be used as a vibration sensor for generating the first vibration signal 36A.

FIG. 3A also illustrates an embodiment of the present invention wherein the second vibration signal of FIG. 2B may comprise a plurality of vibration signals 36B generated in response to the PES. A processing element 64 combines the first vibration signal 36A with the plurality of second vibration signals 36B to generate the third vibration signal for detecting the vibration event. In the embodiment of FIG. 3A, the plurality of vibration signals 36B comprises the PES itself 66, the variance of the PES 68, and a counter value 70 representing the number of times the PES exceeds a threshold 72 within predetermined interval (window). The plurality of vibration signals 36B may comprise any suitable statistical metric, as well as other states of the servo control system derived from the PES, such as the velocity or acceleration of the head. In one embodiment, the processing element 64 applies a weighting to each of the vibration signals 36A and 36B in order to scale the signals relative to one another. For example, the variance of the PES 68 may be given more weight than the PES itself 66.

Figure 3B:
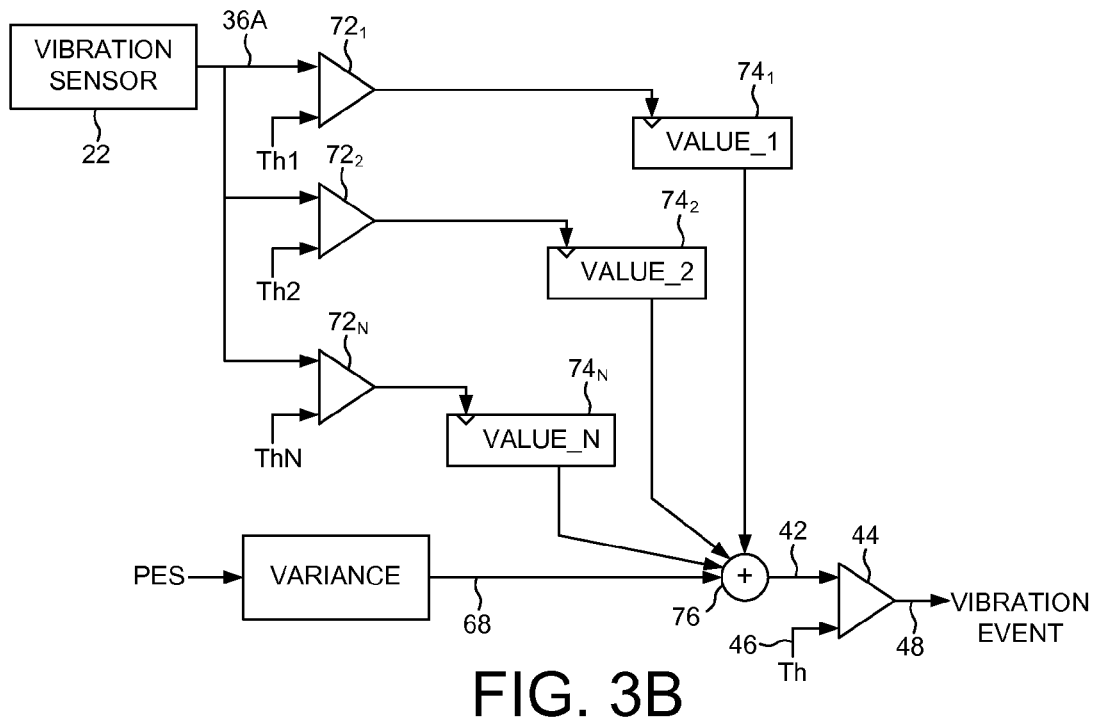
FIG. 3B shows control circuitry according to an embodiment of the present invention wherein an output of the vibration sensor is compared to multiple thresholds in order to generate the first vibration signal which is added to the second vibration signal.

FIG. 3B shows control circuitry according to an embodiment of the present invention for converting the first vibration signal 36A into a digital value using a coarse analog-to-digital converter. The first vibration signal 36A is compared to a plurality of different thresholds Th1-ThN, wherein the output of each comparator $72_1$-$72_N$ enables a corresponding digital value $74_1$-$74_N$. The digital value $74_1$-$74_N$ is then added 76 to the second vibration signal (the PES variance 68 in the embodiment shown) to generate the third vibration signal 42.

Figure 2C:
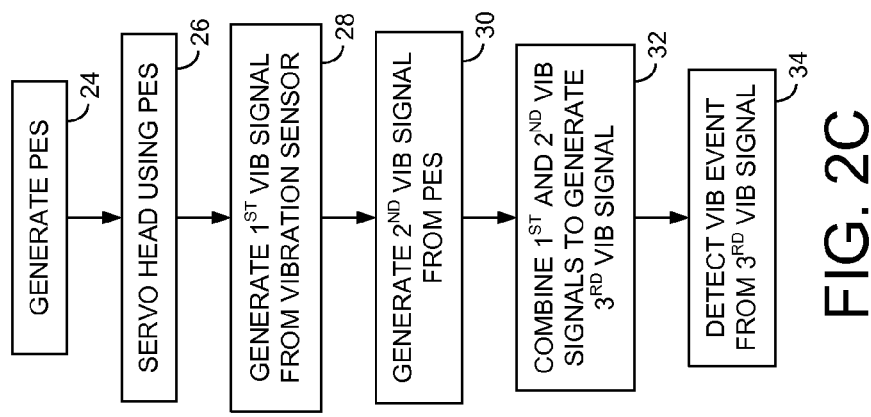
FIG. 2C is a flow diagram according to an embodiment of the present invention wherein a vibration event is detected when both the first and second vibration signals indicate a vibration is occurring.
Figure 4:
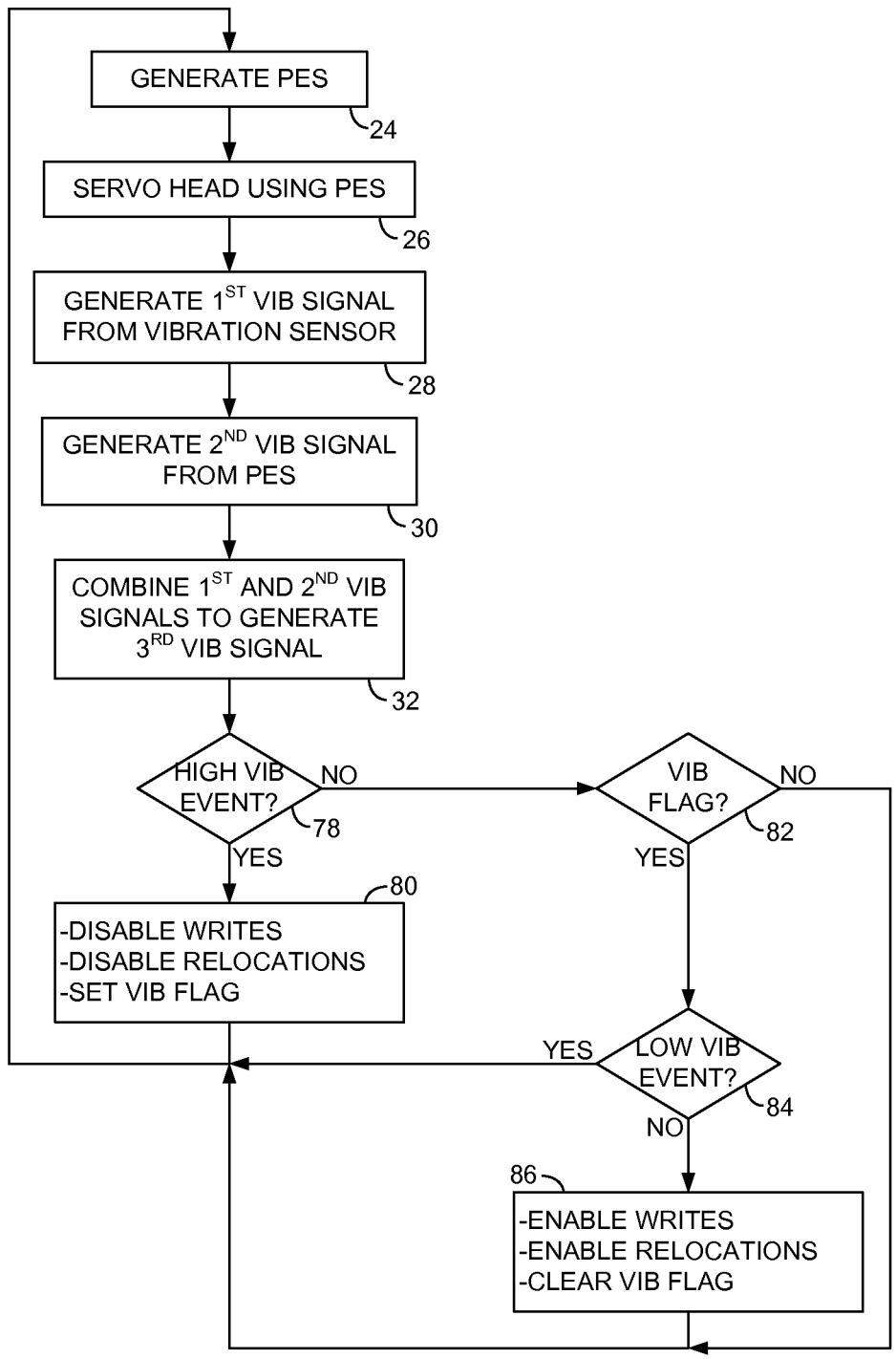
FIG. 4 is a flow diagram according to an embodiment of the present invention wherein when the vibration event is detected, writing to the disk and relocation operations are disabled.

FIG. 4 is a flow diagram according to an embodiment of the present invention which expands on the flow diagram of FIG. 2C, wherein when a vibration event is detected due to the third vibration signal exceeding a high threshold (block 78), write operations and relocation operations are disabled, and a vibration flag is set (block 80). The flow diagram is repeated starting from block 24 until the third vibration signal no longer exceeds the higher threshold at block 78. If the vibration flag is set (block 82), and the third vibration signal still exceeds a lower threshold (block 84), then the disk drive remains in the vibration detected mode with write operations and relocation operations disabled. When the third vibration signal falls below the lower threshold at block 84, the write operations and relocation operations are enabled, and the vibration flag is cleared (block 86). The lower threshold at block 84 provides hysteresis in the vibration detection algorithm.

In the embodiment of FIG. 4, the write operations are disabled only if both the first and second vibration signals 36A and 36B indicate a vibration event is occurring. If the PES alone indicates a low magnitude vibration that is not validated by the vibration sensor 22, then the control circuitry may continue with write operations since the PES is unlikely to improve. That is, the vibration detected by the PES is more likely being caused by defective servo sectors rather than a true vibration event. In this embodiment, the control circuitry may perform a write verify operation on a data track (and optionally a read verify on adjacent data tracks) rather than disable write operations altogether. Although a write verify operation will reduce the performance of the disk drive, the throughput will not fall to zero as would happen when write operations are disabled altogether (or delayed during multiple retry operations). When the vibration sensor 22 validates a vibration event detected by the PES processor 38, the control circuitry disables write operations until the vibration event subsides.

In one embodiment, when a high magnitude vibration is detected in response to the PES, but the vibration sensor 22 does not validate the vibration event, the control circuitry assumes the detected vibration is actually due to defective servo sectors. Since the servo sectors are defective, the data associated with servo sectors (part or all of a data track) may be relocated to a spare data track. However, when the vibration sensor 22 validates a vibration detected in response to the PES, the control circuitry may disable the relocation operations until the vibration event subsides. Once the vibration event subsides, the PES will likely improve so as to enable a reliable write operation. In this manner, the capacity of the disk drive is preserved and the performance impact of accessing spare data tracks is reduced.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
   a disk;
   a head actuated over the disk; and
   control circuitry including a vibration sensor, the control circuitry operable to:
   generate a position error signal (PES) representing a radial location of the head over the disk;
   servo the head radially over the disk in response to the PES;

generate a first vibration signal in response to the vibration sensor;

generate a second vibration signal in response to the PES;

combine the first vibration signal with the second vibration signal to generate a third vibration signal; and detect a vibration event in response to the third vibration signal.

2. The disk drive as recited in claim 1, wherein the control circuitry is further operable to disable writing to the disk in response to the detected vibration event.

3. The disk drive as recited in claim 1, wherein the vibration sensor comprises an accelerometer.

4. The disk drive as recited in claim 1, wherein the vibration sensor comprises at least one of a linear vibration sensor and a rotational vibration sensor.

5. The disk drive as recited in claim 1, wherein the control circuitry is further operable to generate the second vibration signal by computing a variance of the PES.

6. The disk drive as recited in claim 1, wherein the control circuitry is further operable to generate the second vibration signal by detecting when the PES exceeds a threshold.

7. The disk drive as recited in claim 6, wherein the control circuitry is further operable to generate the second vibration signal by detecting a number of times the PES exceeds the threshold over a predetermined interval.

8. The disk drive as recited in claim 1, wherein the control circuitry is further operable detect the vibration event when the third vibration signal exceeds a threshold.

9. The disk drive as recited in claim 1, wherein the control circuitry is further operable to compare an output of the vibration sensor to a plurality of thresholds to generate the first vibration signal.

10. The disk drive as recited in claim 1, wherein the control circuitry is further operable to generate the third vibration signal based on a magnitude of the first vibration signal relative to a magnitude of the second vibration signal.

11. The disk drive as recited in claim 1, wherein the control circuitry is further operable to disable a data relocation operation when the vibration event is detected.

12. A method of operating a disk drive, the disk drive comprising a head actuated over a disk, and a vibration sensor, the method comprising:

generating a position error signal (PES) representing a radial location of the head over the disk;

servoing the head radially over the disk in response to the PES;

generating a first vibration signal in response to the vibration sensor;

generating a second vibration signal in response to the PES;

combining the first vibration signal with the second vibration signal to generate a third vibration signal; and detecting a vibration event in response to the third vibration signal.

13. The method as recited in claim 12, further comprising disabling writing to the disk in response to the detected vibration event.

14. The method as recited in claim 12, wherein the vibration sensor comprises an accelerometer.

15. The method as recited in claim 12, wherein the vibration sensor comprises at least one of a linear vibration sensor and a rotational vibration sensor.

16. The method as recited in claim 12, further comprising generating the second vibration signal by computing a variance of the PES.

17. The method as recited in claim 12, further comprising generating the second vibration signal by detecting when the PES exceeds a threshold.

18. The method as recited in claim 17, further comprising generating the second vibration signal by detecting a number of times the PES exceeds the threshold over a predetermined interval.

19. The method as recited in claim 12, further comprising detecting the vibration event when the third vibration signal exceeds a threshold.

20. The method as recited in claim 12, further comprising comparing an output of the vibration sensor to a plurality of thresholds to generate the first vibration signal.

21. The method as recited in claim 12, further comprising generating the third vibration signal based on a magnitude of the first vibration signal relative to a magnitude of the second vibration signal.

22. The method as recited in claim 12, further comprising disabling a data relocation operation when the vibration event is detected.

* * * * *